Figure 3:
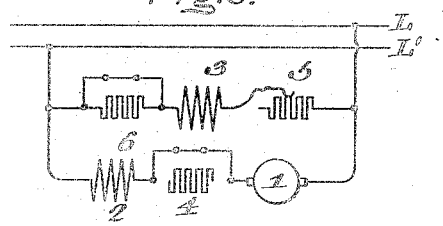

No. 884,541. PATENTED APR. 14, 1908.
L. A. TIRRILL.
SYSTEM OF CONTROL FOR ELECTRIC MOTORS.
APPLICATION FILED FEB. 8, 1906.
2 SHEETS—SHEET 1.
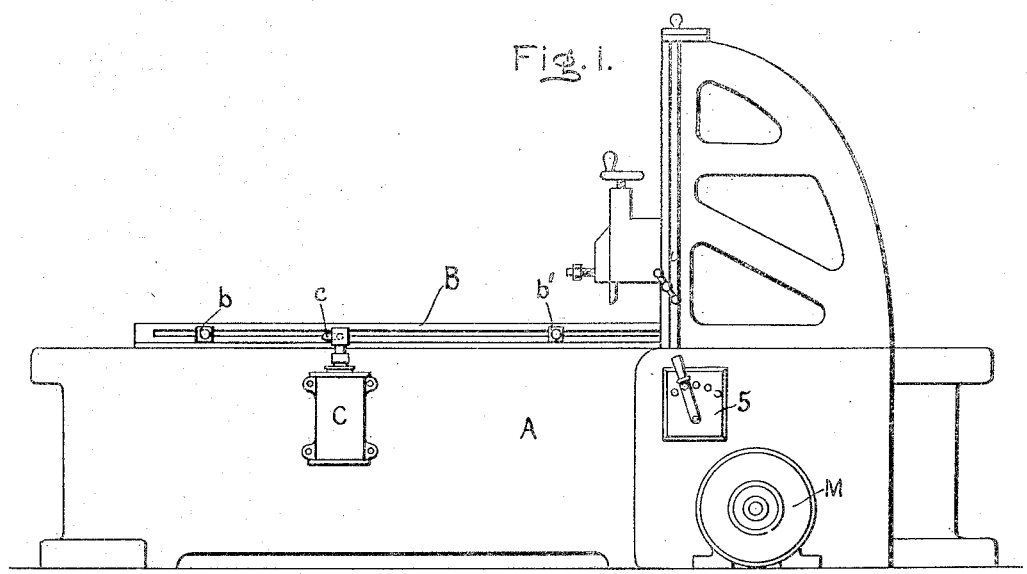
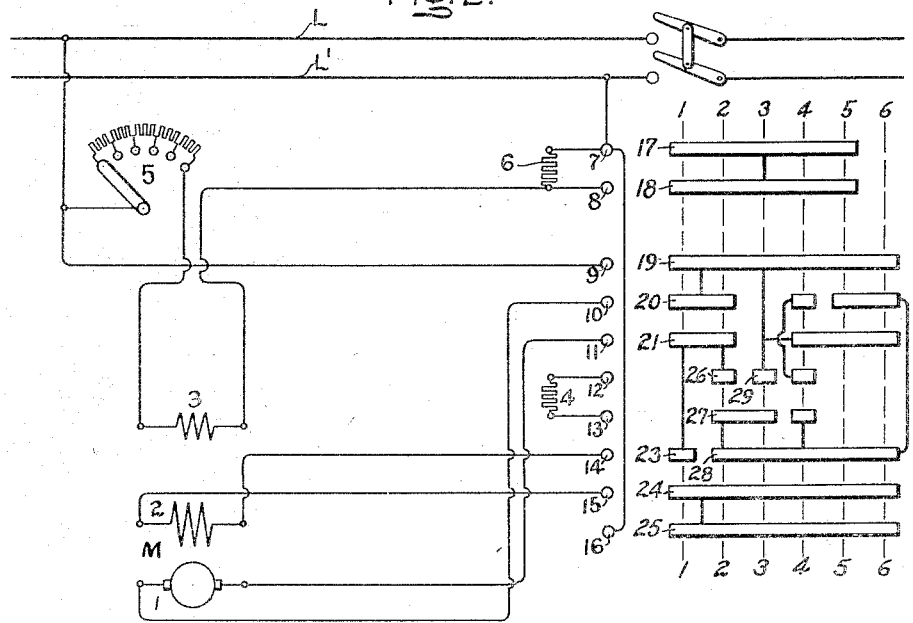
WITNESSES:
INVENTOR:
Leonard A. Tirrill,
By Albert G. Davis
Atty.

No. 884,541. PATENTED APR. 14, 1908.
L. A. TIRRILL.
SYSTEM OF CONTROL FOR ELECTRIC MOTORS.
APPLICATION FILED FEB. 8, 1906.

2 SHEETS—SHEET 2.

WITNESSES:

INVENTOR:
Leonard A. Tirrill,
By
Att'y.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

SYSTEM OF CONTROL FOR ELECTRIC MOTORS.

No. 884,541.  Specification of Letters Patent.  Patented April 14, 1908.

Application filed February 8, 1906. Serial No. 300,059.

*To all whom it may concern:*

Be it known that I, LEONARD A. TIRRILL, a citizen of the United States, residing at Lynn, county of Essex, State of Massachusetts, have invented certain new and useful Improvements in Systems of Control for Electric Motors, of which the following is a specification.

The present invention relates to control systems for electric motors and more particularly to motors which are adapted to be reversed frequently and quickly under load. Such a condition arises upon operating a planer or other machine having reciprocating parts, by means of an electric motor, and securing the reversal of the reciprocating part by reversing the direction of rotation of the motor armature. This service is obviously very severe upon the motor, since the reversal occurs with great frequency and must be effected in a short space of time and while overcoming the momentum and inertia not only of the motor itself, but of the load which is being moved; and for this reason great difficulty has been experienced in operating planers and similar apparatus by means of reversing motors. It is further desirable to make the motor run at a higher rate of speed in one direction than in the other; for example, a slower speed is necessary on the cutting stroke of a planer than on the return stroke.

The object of the invention is to provide a simple system whereby a motor is enabled to be reversed under the most favorable conditions possible in service wherein the motor is required to be reversed frequently while carrying a material load; and to enable the motor to operate most advantageously at different speeds for different directions of rotation.

To the above ends I employ a compound-wound motor, the shunt field winding of which need not be opened during the process of reversing, and connect the series field winding to the source of current supply at the same time that the motor armature is disconnected preparatory to reversing it. In this way a powerful field is built up while the armature is being reversed. Adjustment of speed on the principal working stroke, such as the cutting stroke of a planer, may be made by varying the current in the shunt field winding in the ordinary manner; and, for producing faster operation in one direction than in the other, the influence of the shunt winding is eliminated so that the return speed is unaffected by adjustment of the cutting speed. The method of controlling the shunt field for the purpose of increasing the speed on the return stroke consists preferably in opening a short-circuit about a resistance permanently in the shunt field circuit and having such a value that when the short-circuit is opened the current in the shunt winding is weakened to such an extent that the excitation produced thereby is small as compared to the total excitation. Thus the shunt winding is practically eliminated without at any time opening its circuit and without endangering the insulation of the shunt winding as would be the case if its circuit were interrupted before every return stroke, and the speed of the return stroke is determined by the strength of the series field which of course may be made anything desired by properly proportioning the series turns.

For a fuller explanation of the present invention and of its objects and advantages reference is to had to the following description.

In the accompanying drawing, Figure 1 shows a motor-driven planer adapted to be controlled in accordance with the present invention; Fig. 2 is a diagram showing a motor and one form of control apparatus whereby the present invention may be carried out; and Figs. 3 to 12 are diagrams showing the motor connections during complete cycles of reversals of the motor.

In the drawing the invention is illustrated as applied to a motor-driven planer but it is of course understood that the invention is not limited to this particular use.

A indicates the planer having the reciprocating member B, and M is a motor adapted to operate the same; C is a controller supported adjacent to or upon the planer and adapted to be operated by adjustable stops $b$ and $b^1$ on the reciprocating member. These stops alternately engage with an arm $c$ on the controller to operate the same to reverse the motor; the distance between the stops determining the stroke of the reciprocating member. The controller may be either a main controller or a master controller adapted to govern a motor controller. Since the present invention is not limited to any particular type of controller, the simpler form has been chosen for the purpose of illustration.

In the diagram, Fig. 2, the motor consists of an armature 1, a series field winding 2, and a shunt field winding 3; 4 is a resistance adapted to be connected in series with the armature in starting the motor and to be subsequently cut out; 5 is a rheostat in series with the shunt field for the purpose of varying the speed at which the motor shall be operated in one direction.

6 is a bank of resistances having a high resistance value and being adapted, when connected in circuit with the shunt winding, to reduce the current flow through the shunt winding to such an extent that the effect of the shunt winding becomes unimportant in comparison with the total excitation; L and $L^1$ indicate a source of current supply. The various parts are so arranged that when the controller is in one extreme running position, namely, when the fixed contacts engage with the movable contacts along line 1, 1, the motor rotates in a direction to move the platen B of the planer through its cutting stroke. This is the position which the controller assumes when the platen has been moved to the extreme left and the stop $b^1$ has come into engagement with the handle c on the controller and moved it into one extreme position.

Figure 4:
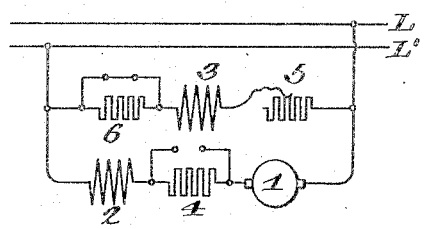
Figure 5:
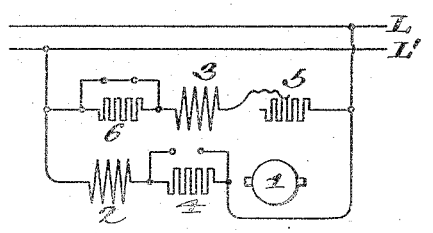
Figure 6:
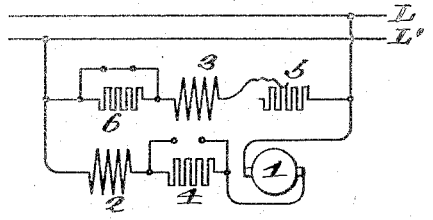
Figure 7:
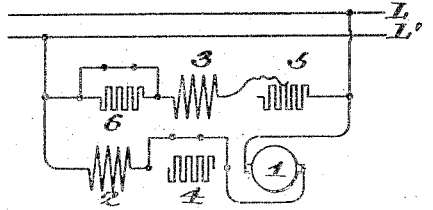
Figure 8:
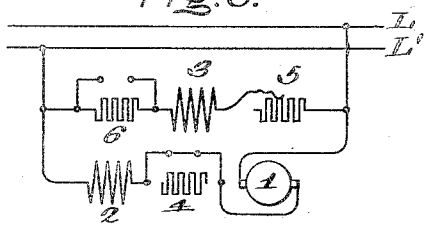
Figure 9:
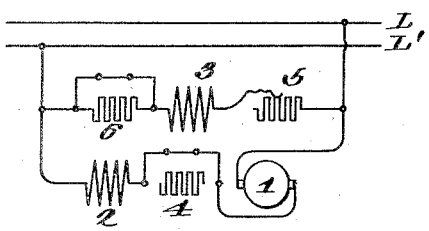
Figure 10:
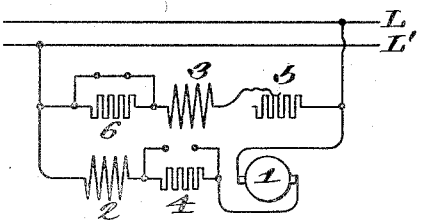
Figure 11:
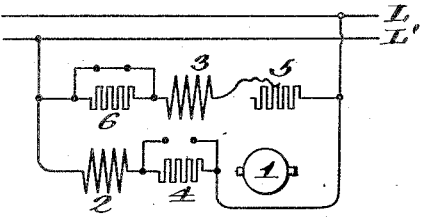
Figure 12:
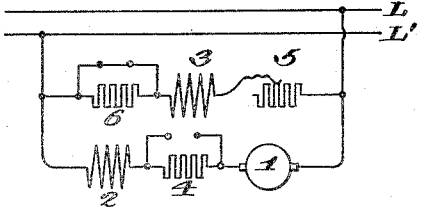

Assuming that the controller is in the running position corresponding to the cutting stroke, circuits may be traced as follows: from line L, through rheostat 5, shunt field winding 3, contacts 8, 18, 17, and 7 of the controller, to line $L^1$. A second circuit extends from line L, through controller contacts, 9, 19, 20, 10, through the armature of the motor, through controller contacts 11, 21, 23, 14, through the series field winding, and thence through controller contacts 15, 24, 25 and 16, to line $L^1$. Thus the armature and series winding are connected across the line with no external resistance in circuit and the shunt field winding is connected across the line in series with rheostat 5; the resistance 6 being short-circuited by the controller as shown in Fig. 3. The motor is preferably so designed that a considerable variation in speed may be obtained by adjusting the rheostat 5, so that the cutting speed may be varied to suit the requirements of any particular piece of work. The controller remains in this running position until the planer has nearly completed its cutting stroke, whereupon the stop b comes into engagement with the arm c and begins to rotate the controller. The parts are so proportioned that the time required to shift the controller from one extreme position to the other is sufficient to permit the motor to bring itself and the platen to rest, so that both the stop b and the arm c are brought to rest at the same time and the controller is left in its sixth position, namely, the position for returning the platen preparatory to the next cutting stroke. It will be seen that in the second position or the first intermediate position of the controller, the current, after passing through the armature, instead of flowing directly from contact 11 to contact 14, now passes from contact 11 through contacts 21 and 26, thence through resistance 4, and to contact 14 by way of contacts 13, 27, and 28. This condition is indicated in Fig. 4. In the third position, the armature is cut out entirely and current flows from line L, through contacts 9, 19, 29 and 12, through resistance 4, and thence through contacts 13, 27, 28 and 14, through the series field winding and thence through contacts 15, 24, 25 and 16 to line $L^1$ as shown in Fig. 5. Therefore, although the armature is cut out, full field is maintained, so that when in the fourth position the armature is again connected in, but in reverse relation to series field (see Fig. 6), the field excitation is at its maximum, thereby providing a maximum torque at the moment of reversal. If desired, the armature when cut out may be short-circuited through a resistance in the third position, thereby providing a dynamic braking action. In position 5 the resistance 4 is again cut out as indicated in Fig. 7. In the final position, the conditions are unchanged except that the short-circuit about resistance 6 is opened at contacts 7 and 8 as shown in Fig. 8, so that the excitation due to the shunt winding is practically eliminated, and the platen is moved on its return stroke at a speed determined by the speed of the motor acting as a series motor. It will be noted that this elimination of the shunt winding is effected without opening the circuit and therefore without endangering the insulation of the motor. Upon approaching the end of its return stroke, the platen again reverses the controller and the motor is gradually reversed and again connected up for operation as a compound-wound motor through the progressive steps indicated in Figs. 9 and 12, and then the starting resistance 4 is again cut out as indicated in Fig. 3.

It will now be seen that the present invention provides a simple method, and one readily carried out by simple control apparatus, for controlling a reversing motor in certain classes of service in such a manner that the most efficient results are obtained with the least strain on the motor and the apparatus operated thereby.

What I claim as new and desire to secure by Letters Patent of the United States, is:—

1. The method of operating a compound-wound motor, which consists in running the motor on full field, reversing the connections of the motor armature while on full field, and then decreasing the excitation produced by the shunt field winding and running the motor as a series motor.

2. The method of operating a reciprocating motor-driven member adapted to move at different speeds in the several directions of its travel, which consists in connecting the motor for operation as a compound-wound motor on full field, reversing the connections of the armature while on full field, and then decreasing the excitation produced by the shunt field winding and running the motor as a series motor.

3. The method of operating a compound-wound motor, which consists in supplying current to the armature and field windings, cutting out the armature and connecting the series field winding to the source of current supply, connecting the armature in reverse relation to the series field winding, and decreasing the excitation produced by the shunt winding to a small proportion of its whole value.

4. The method of operating a compound-wound motor, which consists in supplying current to the armature and field windings, cutting out the armature and connecting the series field winding to the source of current supply, connecting the armature in reverse relation to the series field winding, and then inserting a high resistance in series with the shunt field winding.

5. The method of operating a reciprocating motor-driven member adapted to move at different speeds in the several directions of its travels, which consists in connecting the operating motor as a compound wound motor and then reversing the relative connections of the armature and series field windings and operating the motor as a series motor.

6. The method of operating a reciprocating motor-driven member adapted to move at different speeds in the several directions of its travel, which consists in connecting the motor for operation as a compound-wound motor, cutting out the armature and connecting the series field winding to the source of current supply, connecting the armature reversely with relation to the field winding, and then decreasing the excitation produced by the shunt field winding.

7. In a system of motor control, a compound-wound motor and motor control apparatus constructed and arranged to connect the several windings of said motor to a source of current supply for operation in one direction, to reverse the motor on full field and to weaken the shunt field excitation to a small proportion of the series field excitation.

8. In a system of motor control, a compound-wound motor and control apparatus constructed and arranged to connect the several motor windings to a source of current supply for operation in one direction, to cut out the armature and connect the series field winding to the source of current supply, to connect the armature in reverse relation to the series winding, and to weaken the shunt field excitation to a small proportion of the series field excitation.

9. In a system of motor control, a compound-wound motor, a resistance in the shunt field circuit arranged to weaken the shunt field excitation to a small proportion of the series field excitation, and a controller constructed and arranged to short-circuit said resistance and connect said motor to a source of current supply for one direction of rotation, to reverse the motor on full field and then to open the short-circuit about said resistance.

10. In a system of motor-control, a compound-wound motor, a resistance in the shunt field circuit arranged to weaken the shunt field excitation to a small proportion of the series field excitation, and a controller constructed and arranged to short-circuit said resistance and connect the motor to a source of current supply for rotation in one direction, to cut out the armature and connect the series field winding to the source of current supply, to connect the armature in reverse relation to the series field winding and then to open the short-circuit about said resistance.

11. In combination, a reciprocating member adapted to travel faster in one direction than in the other, a compound-wound motor for driving said reciprocating member, and control apparatus constructed and arranged to connect said motor to a source of current supply for operation in one direction, to automatically reverse said motor on full field and to weaken the shunt field excitation to a small proportion of the series field excitation for operation in the reverse direction.

12. In combination, a reciprocating member adapted to travel faster in one direction than in the other, a compound-wound motor for driving said reciprocating member, a resistance in the shunt field circuit adapted to weaken the shunt field excitation to a small proportion of its whole value, and a controller constructed and arranged to short-circuit said resistance and connect the motor to a source of current supply for rotation in one direction, to reverse the motor and then to open the short-circuit about said resistance for operation in the reverse direction.

In witness whereof I have hereunto set my hand this sixth day of February, 1906.

LEONARD A. TIRRILL.

Witnesses:
JOHN A. MCMANUS, Jr.,
HENRY O. WESTENDARP.